T. L. FAWICK.
POWER TRANSMISSION DEVICE.
APPLICATION FILED JAN. 25, 1915.
1,169,073.
Patented Jan. 18, 1916.
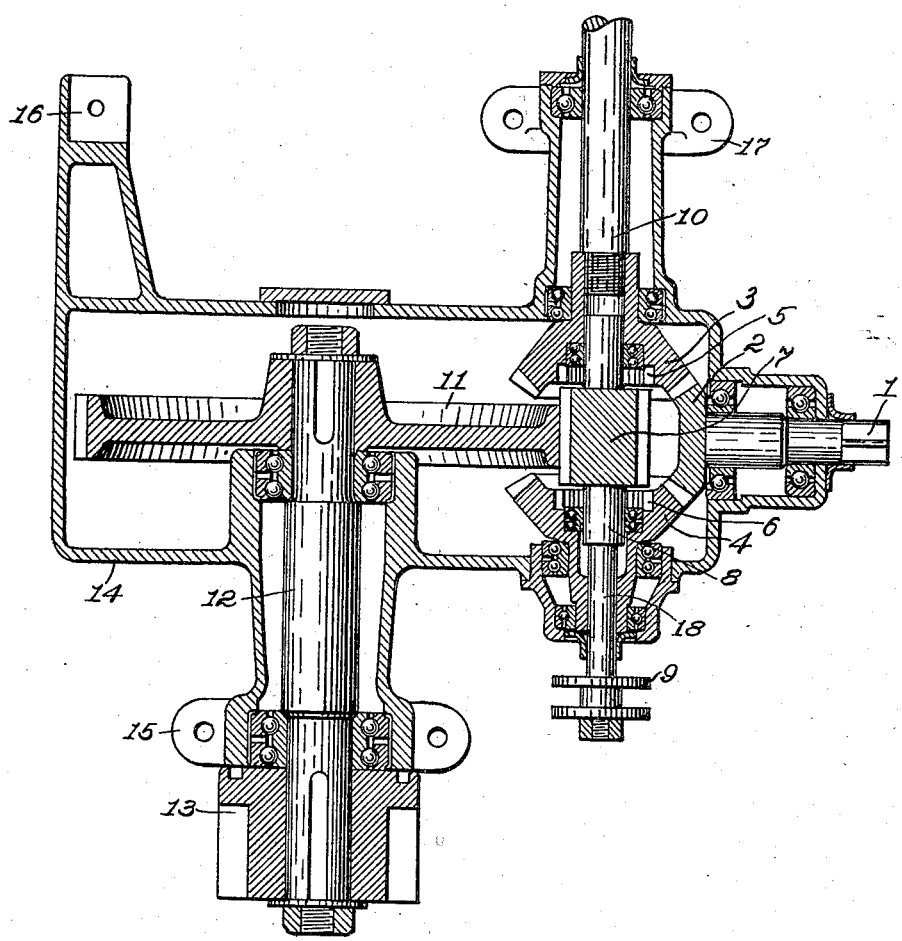
Witnesses:
Pearl Stanton
C. Lindner
Inventor,
Thomas L. Fawick, by
G. C. Kennedy,
Attorney.

UNITED STATES PATENT OFFICE.

THOMAS L. FAWICK, OF SIOUX FALLS, SOUTH DAKOTA.

POWER-TRANSMISSION DEVICE.

1,169,073.  Specification of Letters Patent.  Patented Jan. 18, 1916.

Application filed January 25, 1915. Serial No. 4,320.

*To all whom it may concern:*

Be it known that I, THOMAS L. FAWICK, a citizen of the United States of America, and a resident of Sioux Falls, Minnehaha county, South Dakota, have invented certain new and useful Improvements in Power-Transmission Devices, of which the following is a specification.

My invention relates to improvements in power transmission devices, and the object of my improvement is to supply intermediate mechanism between a driving-shaft and a driven body or bodies adapted to permit of either forward or reverse movement of the latter, while permitting the operation of a pulley-shaft simultaneously or when the other driven bodies are not being actuated.

This object I have accomplished by the means which are hereinafter described and claimed, and which are illustrated in the accompanying drawing, in which is shown a horizontal medial section of the gear casing and of the gearing of my improved power transmission mechanism inclosed therein.

The numeral 4 denotes a hollow casing of rectangular form and having different integral tubular parts provided with anti-friction ball-bearings for the rotatable shaft to be hereinafter described.

The numeral 1 denotes the power- or driving-shaft extending into said casing and mounted rotatably within two spaced sets of ball-bearings, and having a bevel-pinion 2 secured on its inner end within said casing. The numerals 3 and 4 denote like bevel-gear wheels intermeshed with opposite sides of said pinion in said casing. A rotatable shaft 18 is mounted within said casing as is also another rotatable shaft 10 alined therewith but having their adjacent ends spaced apart within the casing. The shafts 18 and 10 are arranged at right angles to a driving-shaft 1, and the bevel-gear wheel 3 is secured upon the inner end of the shaft 10 and is mounted in anti-friction bearings. The bevel-gear 4 is mounted upon the shaft 18 and seated within anti-friction bearings in said casing. On the outer end of the shaft 18 is fixed a collar 9 having spaced annular flanges between which any suitable shifting device may be movably mounted whereby the shaft 18 may be moved longitudinally within said casing and through the hub of the bevel-gear wheel 4, the latter being mounted rotatably upon said shaft, but permitting the latter to slide through it.

The numeral 8 denotes a sleeve mounted non-slidably and non-rotatably on said shaft 18 and carries a wide-toothed pinion 7. The opposed concave faces of the gear-wheels 3 and 4 are provided with like internal gear teeth 2 and 6, respectively with which the ends of the teeth on the pinion 7 may be intermeshed alternately when said pinion is moved to and fro with the shaft 18. One end of the sleeve-part 8 extends slidably into the central hollow of the gear-wheel 3 while the other end extends similarly into the central hollow of the gear-wheel 4, both ends being seated within ball-bearings.

The numeral 11 denotes a relatively large gear-wheel always in mesh with the pinion 7 and fixed upon the inner end of a shaft 12 which is seated within a pair of ball-bearings in a tubular part of said casing to extend outward therefrom and has a pinion 13 secured on its outer end. Said casing has integral orificed ears or lugs 15, 16 and 17, which, as shown, are arranged on opposite sides of said casing 14 in such a way as to provide a three-point suspension for the casing, which is both convenient and practical in use when the transmission device and said casing are mounted in the chassis of a tractor or other vehicle.

In the positions of the parts, as shown in the drawing, where the pinion 7 is in its medial position and not intermeshed with either of the bevel-gear wheels 3 and 4, the driving shaft 1, when rotated, simply rotates the shafts 10 and 18 but not the gear-wheel 11. A pulley may be mounted upon the shaft 10 if desired. When the shaft 18 and the pinion 7 are shifted in one direction to engage the teeth of the pinion with the teeth of the internal gear 5 on said wheel 3, rotation is communicated to said pinion and to the gear-wheel 11 and shaft 12 in one direction. When the shaft 18 and pinion 7 are shifted in an opposite direction sufficiently, the teeth of the pinion are similarly engaged with the teeth of the internal gear 6, which causes the said wheel 4 to impart reversed rotation to said pinion and to the gear wheel 11 and said shaft 12.

It will be observed that the gearing of this transmission device is very compactly arranged within the inclosing casing 14 and that the latter is so contrived and designed that said mechanism is entirely covered and protected from the action of the elements and the intrusion of dust or other substances. Since the shifting means are operatively applied to the collar 9 without said casing, there is nothing intruded from without into said casing which might occasion necessity for often opening the casing.

Slight variations in the dimensions, proportions and details of the device may be made without essentially departing from the scope and principles of the claims.

Having described my invention, what I claim as new, and desire to secure by Letters Patent, is:

1. A power transmission device, comprising a casing having shaft-bearings, a driving bevel-pinion, a driving-shaft seated in one of said bearings on which said driving bevel-pinion is mounted, like bevel-gear wheels intermeshing with teeth on opposite sides of said pinion, said bevel-gear wheels having clutch-elements on their opposed faces and alined central orifices, a rotatable shaft seated rotatably and slidably in said orifices, a pinion fixed on said shaft between said bevel-gear wheels and slidable with said shaft to be intermeshed with the teeth of either of the said clutch elements on said bevel-gear wheels, means on the last mentioned shaft without said casing adapted to shift it longitudinally to and fro, and a gear-wheel always in mesh with the last mentioned pinion.

2. A power transmission device, comprising a casing having shaft bearings, a driving bevel-pinion, a driving-shaft seated in one of said bearings on which said driving bevel-pinion is mounted, like bevel-gear wheels intermeshing with teeth on opposite sides of said pinion, said bevel-gear wheels having clutch-elements on their opposed faces, and alined central openings, a rotatable shaft seated rotatably and slidably in said openings, a pinion fixed on said shaft between said bevel-gear wheels and slidable with said shaft to have the ends of its teeth intermeshed respectively with either of said clutch elements, or to be seated idly between the bevel gears out of mesh with both, means on the last-mentioned shaft without said casing adapted to shift it longitudinally, a gear-wheel always intermeshed with the last mentioned pinion, and a rotatable shaft mounted axially in one of the said bevel-gear wheels.

3. A power transmission device, comprising a casing, a driving-shaft extended thereinto and mounted rotatably therein, a bevel-pinion mounted on said driving-shaft, like bevel-gear wheels intermeshed with teeth on opposite sides of said pinion, said bevel-gear wheels having clutch-elements on their opposed faces, and having alined central openings, a shaft extended into said casing and seated slidably and rotatably in the openings of said bevel-gear wheels, means on the last-mentioned shaft without said casing adapted for use in shifting the shaft longitudinally, a spur-gear wheel fixedly mounted on the last-mentioned shaft between said bevel-gear wheels and having relatively wide teeth whose opposite ends may be respectively intermeshed with the adjacent clutch-elements of said bevel-gear wheels when the last-mentioned shaft is shifted appropriately, the last-mentioned pinion being idle when seated out of mesh with both said internal-gears, a rotary shaft fixedly axially mounted on one of said bevel-gear wheels to extend without said casing, a spur-gear wheel always intermeshed with the last-mentioned pinion, a rotary shaft fixedly axially mounted in the said spur-gear wheel and extending out of said casing, and said casing having three bearing lugs located on opposite sides thereof to provide a three-point suspension-means therefor.

Signed at Waterloo, Iowa, this 6th day of Jan., 1915.

THOMAS L. FAWICK.

Witnesses:
PEARL STANTON,
G. C. KENNEDY.